K. STUDINKA.
TOOL HOLDER.
APPLICATION FILED NOV. 19, 1921.

1,418,987.

Patented June 6, 1922.

K. Studinka, INVENTOR

BY Victor J. Evans

ATTORNEY

UNITED STATES PATENT OFFICE.

KARL STUDINKA, OF DONORA, PENNSYLVANIA.

TOOL HOLDER.

1,418,987.                 Specification of Letters Patent.    Patented June 6, 1922.

Application filed November 19, 1921. Serial No. 516,411.

*To all whom it may concern:*

Be it known that I, KARL STUDINKA, a citizen of the United States, residing at Donora, in the county of Washington and State of Pennsylvania, have invented new and useful Improvements in Tool Holders, of which the following is a specification.

This invention relates to holding devices, and more particularly to a tool holder for use in connection with lathes and similar machines.

One of the main objects of the invention is to provide a tool holder of simple construction and operation having means whereby the tool may be readily removed from the holder when released. A further object is to provide a holder of the character stated which may be produced at small cost. Further objects will appear from the detailed description.

In the drawings:—

Figure 1:
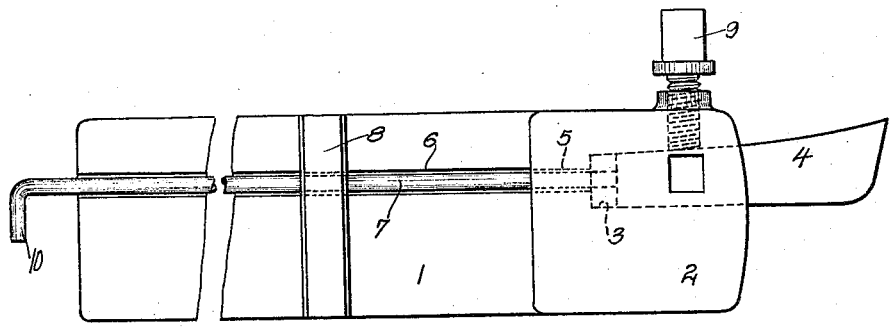
Figure 1 is a side view of a holder constructed in accordance with my invention.
Figure 2:
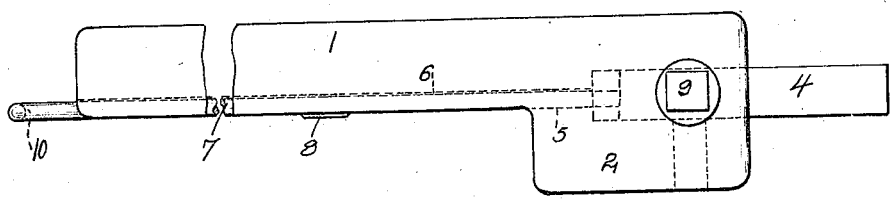
Figure 2 is a top plan view.

The holder includes a body 1 provided at its forward end with a head 2 which is provided with a central socket 3 for reception of the shank of a cutting tool 4. The head is further provided with a bore 5 extending from the inner end of socket 3, this bore communicating with a groove 6 in the lateral face of body 1. An ejector rod 7 is slidably mounted in groove 6 and bore 5, this rod being held against outward movement laterally of body 1 by a retaining plate 8 secured to the body and extending across groove 6. When tool 4 has been inserted into socket 3 it is secured by set screw 9 threaded through the upper portion of head 2. When it is desired to remove the tool this may be readily accomplished by turning set screw 9 out so as to release the shank of tool 4, after which rod 7 is forced inwardly of head 2 thus forcing the tool out of the socket. Inward movement of rod 7 is positively limited by a rectangularly disposed finger 10 at the outer end of the rod.

What I claim is:—

1. In a tool holder, a body provided at one end with a head having a recess for reception of the shank of a tool, said body being provided in one face with a longitudinally extending groove and the head being provided with a bore extending from the inner end of said recess and communicating with the groove, and a rod slidable in said groove.

2. In a tool holder, a body provided at one end with a head having a recess for reception of the shank of a tool, the body being provided with a groove in one face and the head being further provided with a bore extending from said recess and communicating with the groove, a rod slidable in said groove and bore, and a retaining member secured to the body and extending across the groove to prevent displacement of the rod laterally of said body.

In testimony whereof I affix my signature.

KARL STUDINKA.